(12) United States Patent
Yamamoto et al.

(10) Patent No.: US 10,749,599 B2
(45) Date of Patent: Aug. 18, 2020

(54) OPTICAL COMMUNICATION METHOD

(71) Applicant: Panasonic Intellectual Property Management Co., Ltd., Osaka (JP)

(72) Inventors: Masahiko Yamamoto, Osaka (JP); Takeshi Hatakeyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/589,762

(22) Filed: Oct. 1, 2019

(65) Prior Publication Data

US 2020/0169321 A1 May 28, 2020

Related U.S. Application Data

(63) Continuation of application No. PCT/JP2018/002746, filed on Jan. 29, 2018.

(30) Foreign Application Priority Data

Apr. 11, 2017 (JP) ................. 2017-077973

(51) Int. Cl.
*H04B 10/116* (2013.01)
*H05B 47/19* (2020.01)
(Continued)

(52) U.S. Cl.
CPC ......... *H04B 10/116* (2013.01); *H04B 10/677* (2013.01); *H04M 1/725* (2013.01); *H04N 5/225* (2013.01); *H05B 47/19* (2020.01)

(58) Field of Classification Search
CPC .... H04B 10/116; H04B 10/677; H05B 47/19; H04M 1/725; H04N 5/225
See application file for complete search history.

(56) References Cited

U.S. PATENT DOCUMENTS

2005/0008075 A1* 1/2005 Chang .................. H04N 19/152
375/240.03
2007/0024571 A1 2/2007 Maniam et al.
(Continued)

FOREIGN PATENT DOCUMENTS

JP 2007-43706 2/2007
JP 2016-525847 8/2016

OTHER PUBLICATIONS

International Search Report dated Mar. 20, 2018 in corresponding International Application No. PCT/JP2018/002746.

*Primary Examiner* — Mina M Shalaby
(74) *Attorney, Agent, or Firm* — Wenderoth, Lind & Ponack, L.L.P.

(57) ABSTRACT

An optical communication method is an optical communication method for performing optical communication with a light-emitting device serving as a communication target. The optical communication method includes: a first step of reading information relating to a distance to the light-emitting device and information relating to a size of a light-emitting region included in the light-emitting device, the information relating to the distance and the information relating to the size being stored in advance; a second step of controlling an imaging range of a camera based on the information relating to the distance and the information relating to the size, the camera capturing an image of light from the light-emitting device; and a third step of extracting a signal from light emitted from the light-emitting device based on image data that the camera has captured in the imaging range.

2 Claims, 8 Drawing Sheets

(51) Int. Cl.
*H04B 10/67* (2013.01)
*H04M 1/725* (2006.01)
*H04N 5/225* (2006.01)

(56) References Cited

U.S. PATENT DOCUMENTS

| | | | |
|---|---|---|---|
| 2010/0260385 A1* | 10/2010 | Chau | G06T 19/006 382/107 |
| 2011/0052214 A1* | 3/2011 | Shimada | H04B 10/116 398/202 |
| 2014/0186049 A1* | 7/2014 | Oshima | H04W 4/21 398/118 |
| 2014/0321859 A1* | 10/2014 | Guo | H04B 10/116 398/118 |
| 2016/0164606 A1* | 6/2016 | Liu | H04B 10/116 398/118 |

\* cited by examiner

OPTICAL COMMUNICATION METHOD

BACKGROUND

1. Technical Field

The present disclosure relates to an optical communication method for demodulating a signal from received light.

2. Description of the Related Art

Patent Literature 1 (PTL 1) discloses a visible light communication transmitter that transmits a data signal by turning on a backlight based on a modulation signal obtained by modulating the data signal. This enables communication using visible light.

Here, PTL 1 is Unexamined Japanese Patent Publication No. 2007-43706.

SUMMARY

The present disclosure provides an optical communication method that enables a necessary signal to be easily extracted from a plurality of optical signals.

An optical communication method in a first aspect of the present disclosure is an optical communication method for performing optical communication with a light-emitting device serving as a communication target. The optical communication method includes: a first step of reading information relating to a distance to the light-emitting device and information relating to a size of a light-emitting region included in the light-emitting device, the information relating to the distance and the information relating to the size being stored in advance; a second step of controlling an imaging range of a camera based on the information relating to the distance and the information relating to the size, the camera capturing an image of light from the light-emitting device; and a third step of extracting a signal from light emitted from the light-emitting device based on image data that the camera has captured in the imaging range.

An optical communication method in a second aspect of the present disclosure is an optical communication method for performing optical communication with a light-emitting device serving as a communication target. The optical communication method includes: a first step of specifying at least one image region that corresponds to a light-emitting region of the light-emitting device, the at least one image region being included in image data that a camera has captured and has output; a second step of selecting one image region as a selected region from among the at least one image region based on a predetermined condition; and a third step of extracting a signal based on information relating to the selected region.

An optical communication method according to the present disclosure is effective to extract a necessary signal from a plurality of optical signals.

DETAILED DESCRIPTION

Exemplary embodiments are described in detail below with reference to the drawings as appropriate. However, in some cases, a description more detailed than necessary is omitted. For example, a detailed description of a well-known matter and a duplicated description of substantially the same configuration is omitted in some cases. This is to avoid unnecessary redundancy in the description below and to make the description below easily understandable to those skilled in the art.

It is noted that the accompanying drawings and the description below are provided to enable those skilled in the art to fully understand the present disclosure, and are not intended to limit the claimed subject matter.

In aircraft, railway vehicles, or the like, information such as a video can be displayed by using a video display device disposed in each seat. In addition, a portable terminal (such as a smartphone or a tablet) possessed by a passenger is paired with the video display device, and this enables wireless communication to be performed between the portable terminal and the video display device. This enables the portable terminal to be used as a remote controller of the video display device, or enables the portable terminal to receive a video or the like from the video display device and to reproduce the video or the like.

In order to pair the video display device with the portable terminal possessed by the passenger, respective pieces of peculiar information (identification (ID) information) are required. Accordingly, the ID information is transmitted while being superimposed as an optical signal onto light of a backlight of a liquid crystal display (LCD), a spotlight, or the like that is included in the video display device, and an image of the ID information is captured by using an image sensor of a camera included in the portable terminal. This enables the ID information to be received from the LCD, the spotlight, or the like.

In a case where peculiar information is transmitted while being superimposed as an optical signal onto light of the backlight of the LCD of the video display device and the portable terminal reads this peculiar information, an optical signal from a video display device that corresponds to another seat such as an adjacent seat, rather than a video display device that corresponds to a seat that the passenger is sitting on, is input to the image sensor of the portable terminal, and this results in the reading of ID information from an unintended video display device in some cases.

The present disclosure provides an optical communication method that enables a necessary signal to be easily extracted even in a situation where optical signals can be received from a plurality of devices.

First Exemplary Embodiment

An optical communication method according to a first exemplary embodiment of the present disclosure is described with reference to FIGS. 1 to 5.

1-1. Configuration

Figure 1:
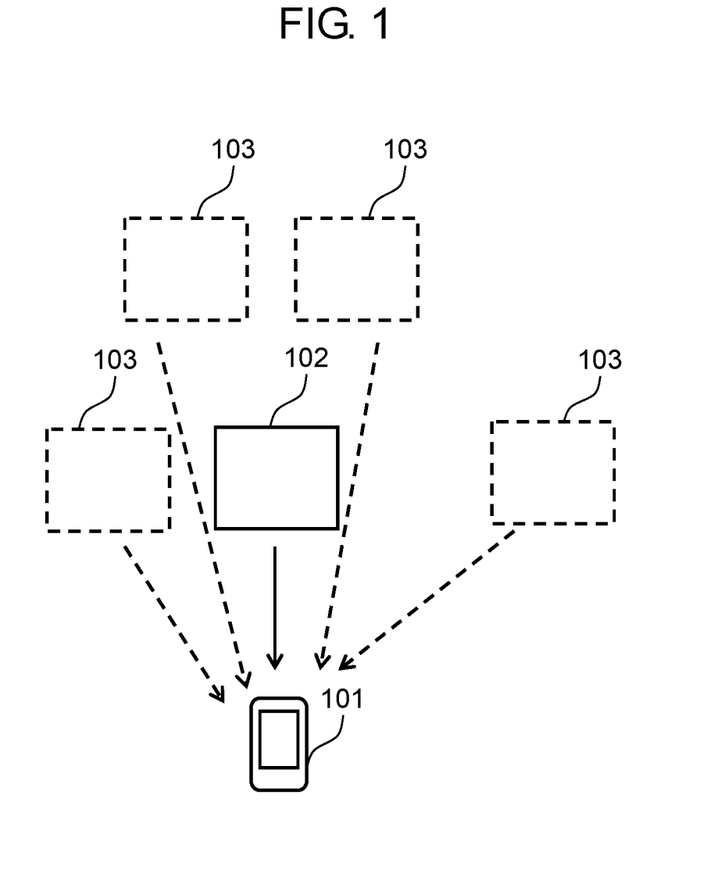
FIG. 1 is a diagram schematically illustrating a positional relationship between a video display device and a portable terminal of a passenger according to a first exemplary embodiment.

FIG. 1 is a diagram schematically illustrating a positional relationship between a video display device and a portable terminal of a passenger according to the present exemplary embodiment. The description below is provided by using, as an example, a case where a video display device provided in a seat equipped in a cabin of an aircraft is paired with a portable terminal of a passenger. When the passenger boards on the aircraft, the passenger takes portable terminal 101 that is possessed by the passenger on the aircraft. The passenger can pair video display device 102 that corresponds to a seat that the passenger is sitting on with portable terminal 101 so as to perform communication via Bluetooth (registered trademark; hereinafter the similar is applied). Portable terminal 101 receives ID information that is indicated by an optical signal transmitted from video display device 102, so that pairing is performed. The ID information is also referred to as a passcode or a PIN code in Bluetooth. Note that portable terminal 101 can not only receive ID information from video display device 102 to be paired, but can also receive ID information from other video display devices 103 (video display devices that are different from video display device 102 to be paired are referred to as other video display devices 103). The video display device is an example of a light-emitting device.

Figure 2:
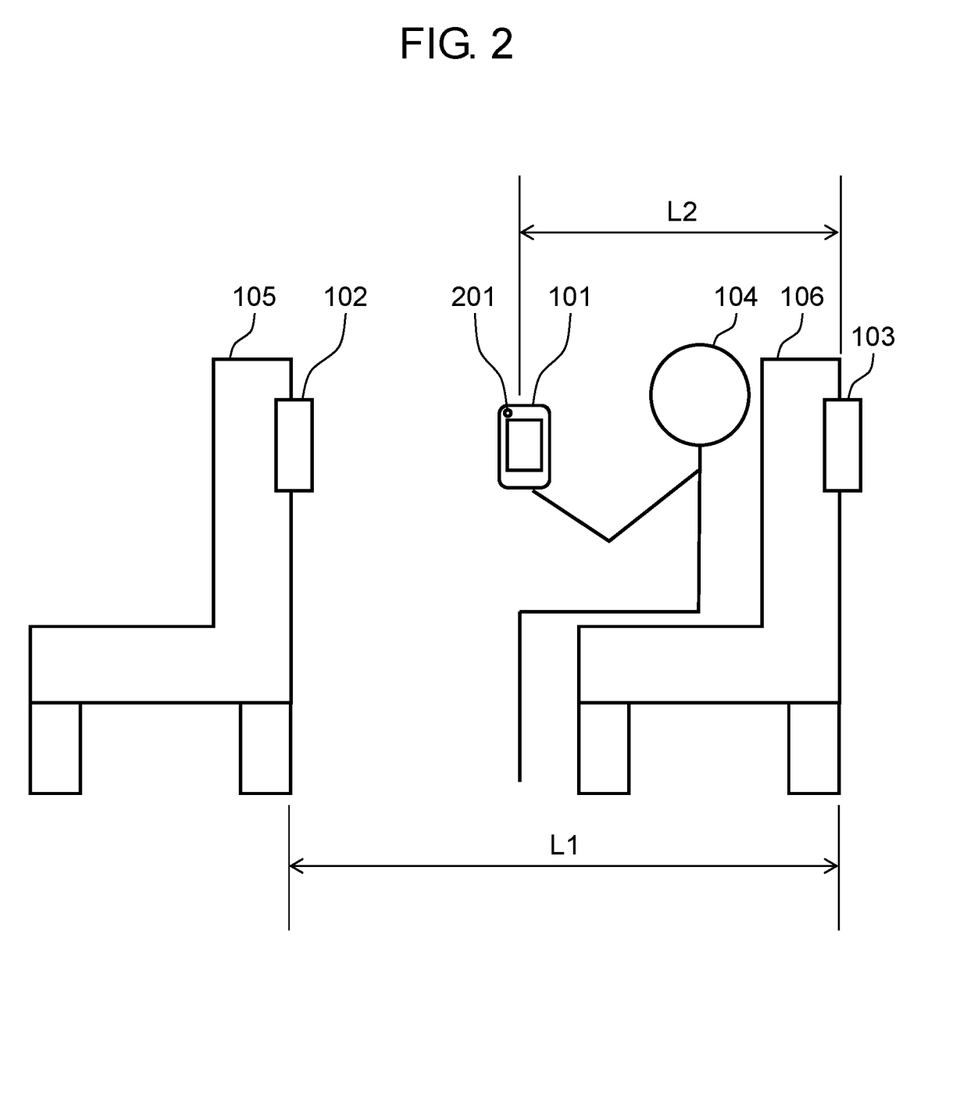
FIG. 2 is a side view of a positional relationship between the video display device and the portable terminal according to the first exemplary embodiment.

FIG. 2 is a side view of a positional relationship between video display device 102 provided in an aircraft cabin and the portable terminal of passenger 104. Video display device 102 is provided on a back surface of seat 105 that is disposed in front of the passenger. Portable terminal 101 possessed by the passenger includes camera 201. It is assumed that a distance from the back surface of seat 105 located forward to a back surface of seat 106 that passenger 104 is sitting on is seat interval L1 and a distance from the back surface of seat 106 to portable terminal 101 that the passenger is directing forward is terminal distance L2. Note that terminal distance L2 is assumed to indicate an average distance from the back surface of seat 106 to portable terminal 101 at a time when an adult with an average physique who is sitting on a seat is holding portable terminal 101 in order to capture an image of video display device 102 by using camera 201.

Figure 3:
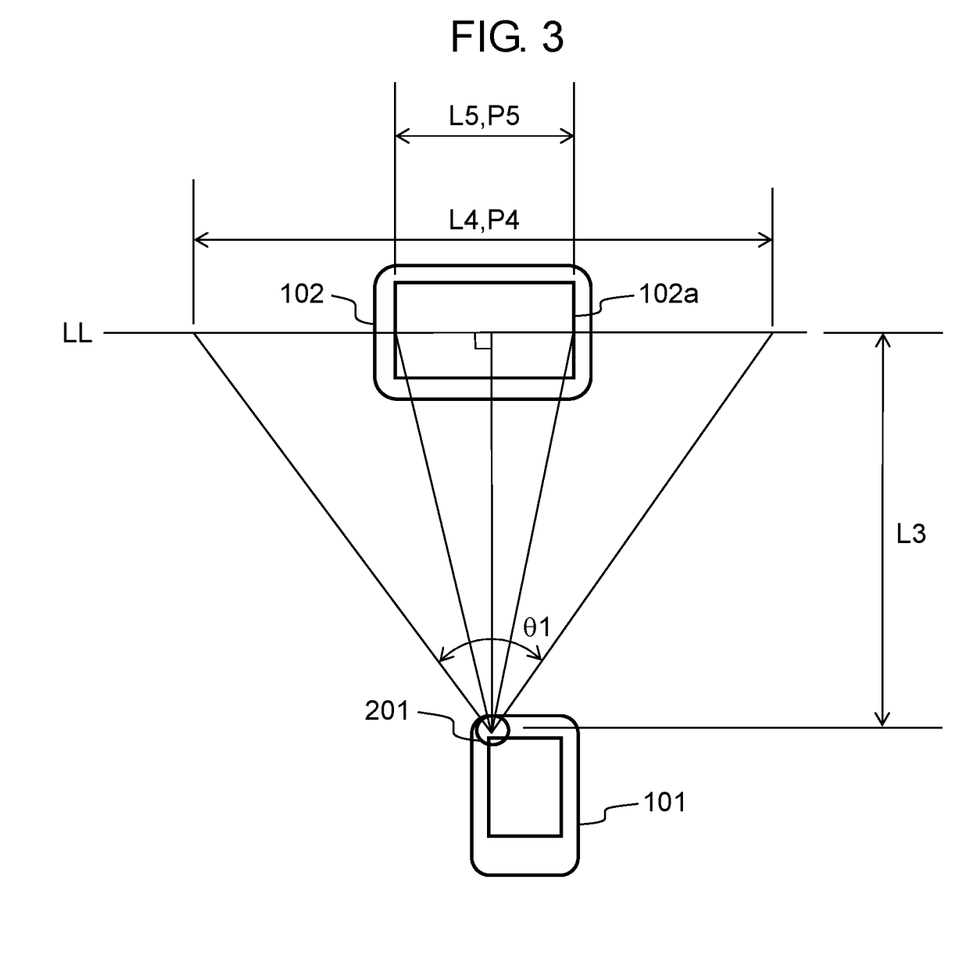
FIG. 3 is a schematic diagram illustrating a positional relationship between the video display device and a camera of the portable terminal according to the first exemplary embodiment.

FIG. 3 is a schematic diagram illustrating a positional relationship between the video display device and the camera of the portable terminal. In FIG. 3, it is assumed that camera 201 of portable terminal 101 is disposed in front of video display device 102 so as to face video display device 102. Video display device 102 includes video display 102a that is configured by an LCD monitor or the like. Video display 102a is an example of a light-emitting region. Camera 201 and video display device 102 are disposed in such a way that an optical axis of camera 201 perpendicularly crosses a display surface in a center of video display 102a of video display device 102. A distance from video display device 102 to camera 201 of portable terminal 101 is assumed to be imaging distance L3.

Camera 201 of portable terminal 101 has angle of view θ1. Under the assumption that camera 201 is a single-focus camera, angle of view θ1 has a fixed value. A range where imaging can be performed at angle of view θ1 is an imaging range of camera 201.

Straight line LL is assumed that is perpendicular to straight line connecting camera 201 of portable terminal 101 and video display device 102, is parallel to a longitudinal direction of video display 102a, and passes through video display 102a. When camera 201 of portable terminal 101 images a direction of video display device 102, a length that is included in a range of angle of view θ1 of straight line LL (an actual length of straight line LL that is included in image data obtained by portable terminal 101) is assumed to be imaging width L4. Imaging width L4 is obtained according to formula (1).

$$L4 = 2 \times L3 \times \tan(\theta1/2) \qquad (1),$$

where $$L3 = L1 - L2 \qquad (2)$$

It is also assumed that a number of pixels in a horizontal direction of image data that is obtained in an imaging operation of camera 201 is P4. Number of pixels P4 is determined on the basis of a number of recording pixels of camera 201. For example, in a case where the number of recording pixels of the camera is 4000 pixels in width×3000 pixels in height, number of pixels P4 is 4000 pixels.

It is assumed that a width of video display 102a of video display device 102 is display width L5. It is also assumed that a number of pixels in a range where video display 102a is indicated in image data (namely, a range that corresponds to display width L5) is number of pixels P5. Number of pixels P5 is obtained according to formula (3).

$$\begin{aligned} P5 &= L5/L4 \times P4 \\ &= L5/(2 \times L3 \times \tan(\theta1/2)) \times P4 \end{aligned} \qquad (3)$$

Seat interval L1, terminal distance L2, and imaging distance L3 are examples of information relating to a distance from a portable terminal to a light-emitting device. Display width L5 is an example of information relating to a size of a light-emitting region.

Figure 4:
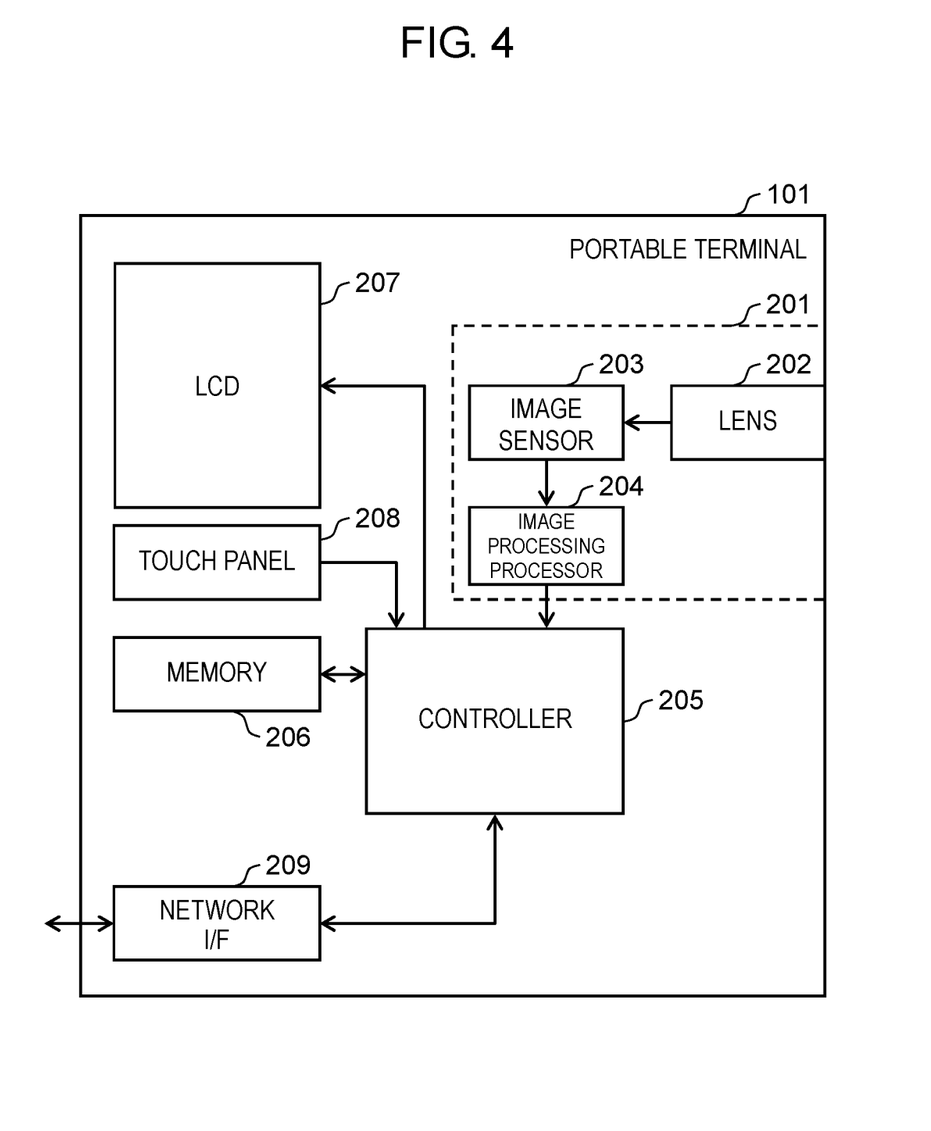
FIG. 4 is a block diagram illustrating an electrical configuration of the portable terminal according to the first exemplary embodiment.

FIG. 4 is a block diagram illustrating an electrical configuration of the portable terminal according to the present exemplary embodiment. Portable terminal 101 includes camera 201, controller 205, memory 206, LCD 207, touch panel 208, and network interface (I/F) 209.

Camera 201 includes lens 202, image sensor 203, and image processing processor 204. Lens 202 condenses light from an object, and forms an object image. Image sensor 203 captures the object image formed by lens 202, and generates image data.

Image processing processor 204 includes a circuit that performs predetermined image processing on the image data. The image processing includes digital zoom processing for magnifying or reducing an entirety of an image or for performing magnification or reduction after cutting out a portion of image data (trimming), processing for recognizing a shape of an object included in the image data, processing for performing synthesis with image data formed according to a program, and other processing. The digital zoom processing is an example of processing for controlling an imaging range of a camera.

Memory 206 includes a read only memory (ROM), a random access memory (RAM), or the like. Memory 206 also functions as a frame memory that stores image data or a working memory that transitorily stores data. Memory 206 stores a program executed by controller 205 and various types of data including an arithmetic result of controller 205, a value of angle of view θ1, and information relating to the number of recording pixels of camera 201.

Controller 205 executes a program stored in memory 206, controls respective units of portable terminal 101, and performs a variety of arithmetic operations or pieces of information processing. For example, controller 205 can perform reading from and writing to memory 206. Controller 205 stores, in memory 206, image data transmitted from image processing processor 204. Controller 205 reads image data from memory 206, and causes the image processing processor to perform predetermined image processing. Controller 205 reads image data from memory 206, and causes LCD 207 to display the image data. Controller 205 also performs communication with an external device via network interface 209.

LCD 207 displays various types of content according to a command from controller 205.

Touch panel 208 is disposed on a surface of LCD 207. When a user touches a display on LCD 207, touch panel 208 transmits information indicating a touched position to controller 205. Controller 205 performs control according to this information, so that the user can perform an intuitive operation.

Network interface 209 is an interface that is used for controller 205 to perform wireless communication according to Bluetooth with an external device (not illustrated).

1-2. Operation

Figure 5:
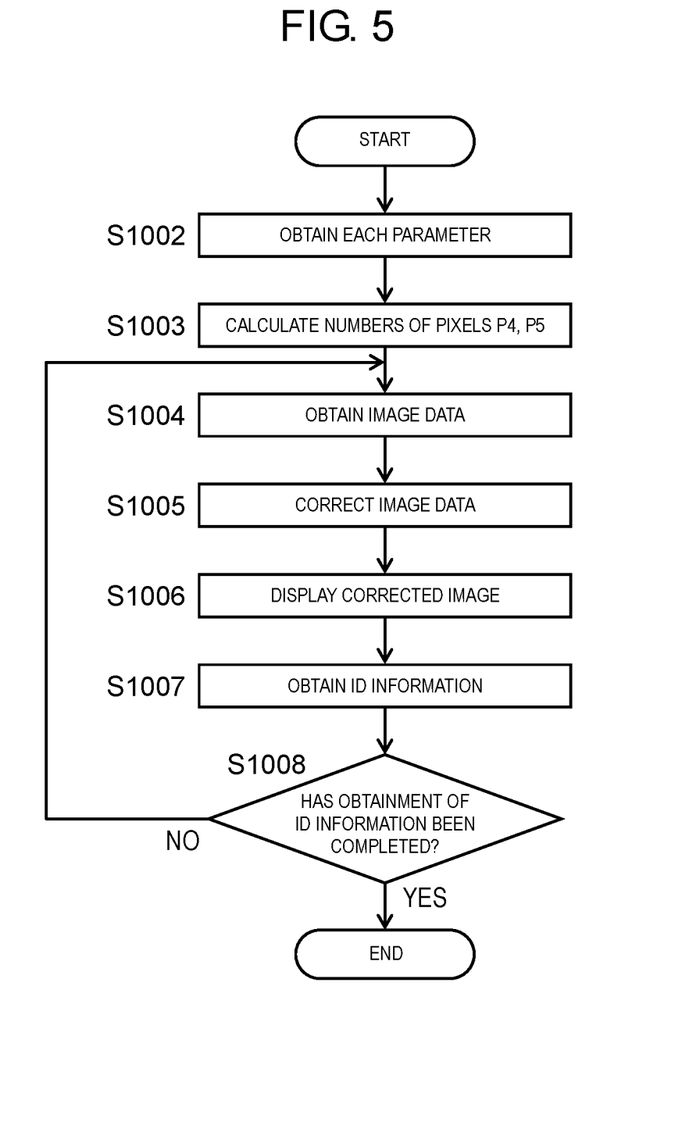
FIG. 5 is a flowchart illustrating processing in which the portable terminal obtains ID information according to the first exemplary embodiment.

A pairing operation of the portable terminal is described with reference to the flowchart illustrated in FIG. 5. The description below is provided by using, as an example, digital zoom processing performed on image data of image processing performed by image processing processor 204.

It is assumed that, before the pairing operation, portable terminal 101 obtains seat interval L1, terminal distance L2, and display width L5, and stores seat interval L1, terminal distance L2, and display width L5 in memory 206. Stated another way, before a passenger takes portable terminal 101 on an aircraft, the passenger operates portable terminal 101 so as to download information relating to seat interval L1, terminal distance L2, and display width L5 into portable terminal 101 via the Internet. For example, the passenger installs an application program provided by an airline company in portable terminal 101, and executes the application program. Portable terminal 101 accesses a server of the airline company via the Internet, and obtains seat interval L1, terminal distance L2, and display width L5.

Specifically, the server of the airline company holds, in a database, information that associates an aircraft registration specifying a managed aircraft with a flight code. In addition, the server holds, in the database, information relating to seat interval L1 and display width L5 of video display 102a of video display device 102 that has been equipped, for each seat of each aircraft. Further, the server holds, in the database, a predetermined value relating to terminal distance L2. When the passenger executes the application program so as to purchase an airline ticket, the server determines boarding date, a flight code, and a seat number, and transmits, to portable terminal 101, the boarding date, the flight code, and the seat number as ticket information including an airline company, boarding date, a flight code, and a seat number. At this time, the server specifies seat interval L1 and display width L5 from the database on the basis of the ticket information, and transmits seat interval L1 and display width L5 together with terminal distance L2 to portable terminal 101. Portable terminal 101 receives seat interval L1, terminal distance L2, and display width L5 together with the ticket information from the server of the airline company, and stores them in memory 206.

In a case where the passenger makes an attempt to pair portable terminal 101 possessed by the passenger with video display device 102 of a seat so as to enable communication, the passenger operates video display device 102 so as to cause portable terminal to enter into a pairing available state. When video display device 102 enters into the pairing available state, video display device 102 generates ID information at random. Next, video display device 102 generates a device name of Bluetooth from the ID information according to a predetermined rule. Then, video display device 102 sends the device name via the network I/F. In addition, video display device 102 transmits an image to be displayed onto which an optical signal indicating the ID information has been superimposed, at every fixed time (for example, every second).

In addition, the passenger operates portable terminal 101 so as to execute the application program, and issues an instruction to start pairing with video display device 102 that corresponds to a seat that the passenger is sitting on. Portable terminal 101 requests that the passenger hold camera 201 of portable terminal 101 in such a way that camera 201 faces video display device 102, and portable terminal 101 starts an imaging operation of camera 201. Then, portable terminal 101 performs the operation described below so as to obtain the ID information from video display device 102, and performs pairing for performing wireless communication according to Bluetooth on the basis of the ID information. FIG. 5 is a flowchart illustrating processing in which portable terminal 101 obtains ID information in order to perform pairing.

Step S1002: Controller 205 of portable terminal 101 obtains each parameter. Specifically, controller 205 reads, from memory 206, information relating to angle of view θ1 of an image that can be obtained by using lens 202 of camera 201, seat interval L1, terminal distance L2, and display width L5. Controller 205 also reads, from memory 206, information relating to the number of recording pixels of camera 201.

Step S1003: Controller 205 calculates number of pixels P4 and number of pixels P5. Specifically, controller 205 calculates number of pixels P4 in a horizontal direction of image data on the basis of the information relating to the number of recording pixels. Next, controller 205 calculates number of pixels P5 in a range where video display 102a is indicated in the image data, by using formula (3).

Step S1004: Controller 205 causes camera 201 to perform an imaging operation so as to obtain image data. The obtained image data is stored in memory 206 in frame units.

Step S1005: Controller 205 controls image processing processor 204 so as to perform digital zoom processing (correction processing) on the image data. Specifically, controller 205 determines a cut-out region (a cut-out range) to be cut out from the image data. It is assumed that a number of pixels in a horizontal direction of the cut-out region is number of pixels P5. A number of pixels in a vertical direction of the cut-out region is determined in such a way that an aspect ratio of original image data is equal to an aspect ratio of cut-out image data. Controller 205 controls image processing processor 204 to cut out an image region having the numbers of pixels described above from a center of the image data. Then, controller 205 controls image processing processor 204 to magnify or reduce the cut-out image data so as to have a size displayable on LCD 207. Thus, digital zoom processing performed on the image data is completed. As a result of digital zoom processing, an image region having almost the same size as a size of video display 102*a* that is estimated to be indicated in the image data is magnified to have the same size as a size of the image data. Accordingly, in a case where video display 102*a* is indicated in a center of the image data, video display 102*a* is magnified up to an entirety of the image data as a result of digital zoom processing.

Step S1006: Controller 205 causes LCD 207 to display image data after digital zoom processing. The passenger views an image displayed on LCD 207 so as to understand that the video display device is being displayed, namely, that the passenger is directing camera 201 in a correct direction. In addition, even in a case where an orientation of camera 201 deviates from a direction of video display device 102, the passenger can easily recognize a degree of deviation, and can change the orientation of camera 201 to the direction of video display device 102.

Step S1007: Controller 205 obtains ID information transmitted from video display device 102. Specifically, the passenger is holding camera 201 of portable terminal 101 in such a way that camera 201 faces video display 102*a* of video display device 102, and therefore video display 102*a* is indicated in image data obtained by performing digital zoom processing in S1005 (or image data that has been cut out from original image data in digital zoom processing) of image data obtained by imaging using camera 201. Controller 205 analyzes image data after digital zoom processing (or the cut-out image data) so as to extract an optical signal superimposed onto the image data, and obtains the ID information from the optical signal.

Step S1008: Controller 205 determines whether the obtainment of the ID information from the image data has been completed. The ID information is superimposed onto image data including a plurality of frames in some cases. Captured image data does not include the ID information in other cases. In a case where controller 205 determines that the obtainment of the ID information has not been completed, for example, due to the obtainment of only a portion of the ID information from the image data (NO in S1008), the processing returns to step S1004, and controller 205 repeats processing for capturing next image data and obtaining ID information (S1004 to S1007). In a case where controller 205 determines that the obtainment of the ID information from the image data has been completed (YES in S1008), controller 205 stores the obtained ID information in memory 206, and terminates the processing.

By performing the operation described above, portable terminal 101 obtains ID information from video display device 102. Then, controller 205 of portable terminal 101 controls network I/F 209 so as to perform pairing for performing wireless communication with video display device 102 according to Bluetooth on the basis of the obtained ID information.

Pairing is performed as described below. According to the application program of portable terminal 101, a device name of Bluetooth can be generated from the ID information in accordance with the same rule as a rule of video display device 102. Portable terminal 101 generates a device name from the obtained ID information. Next, portable terminal 101 receives device names of Bluetooth that have been sent by surrounding devices (video display devices 102) via network I/F 209, and specifies a device name that is the same as the generated device name. Portable terminal 101 transmits the ID information to video display device 102 that has sent the specified device name. When video display device 102 receives the ID information from portable terminal 101, video display device 102 compares the ID information with held ID information. When the received ID information is identical to the held ID information, video display device 102 establishes connection with portable terminal 101. As a result of the operation described above, portable terminal 101 and video display device 102 are paired, and this enables communication according to Bluetooth.

1-3. Advantageous Effects and the Like

As described above, in the present exemplary embodiment, an optical communication method is an optical communication method for performing optical communication with video display device 102 serving as a communication target. The optical communication method includes: a first step of reading information relating to imaging distance L3 from portable terminal 101 to video display device 102, and display width L5 of video display 102*a* included in video display device 102, imaging distance L3 and display width L5 having been stored in advance; a second step of controlling an imaging range of camera 201 on the basis of the information relating to imaging distance L3 and the information relating to display width L5, camera 201 capturing an image of light from video display device 102; and a third step of extracting a signal from emitted light of video display device 102 on the basis of image data that camera 201 has captured in the imaging range.

This facilitates receiving an optical signal that has been sent by video display device 102 intended by a passenger (video display device 102 that corresponds to a seat that the passenger is sitting on) from among a plurality of video display devices and extracting a necessary signal. Stated another way, the optical communication method according to the present exemplary embodiment is effective to extract a necessary signal from a plurality of optical signals.

Second Exemplary Embodiment

Figure 6:
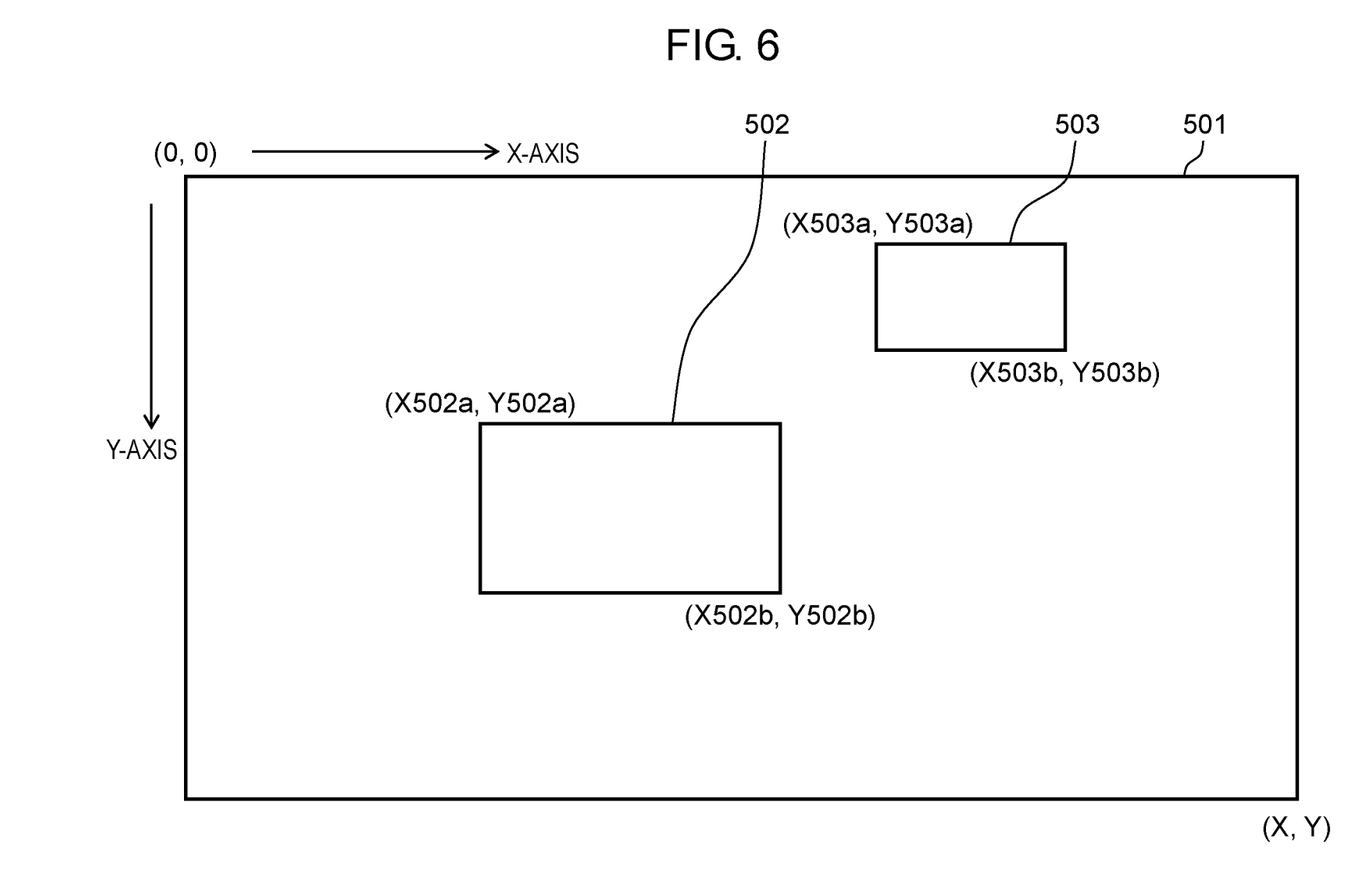
FIG. 6 is a diagram illustrating an example of image data obtained by a portable terminal according to a second exemplary embodiment.
Figure 7:
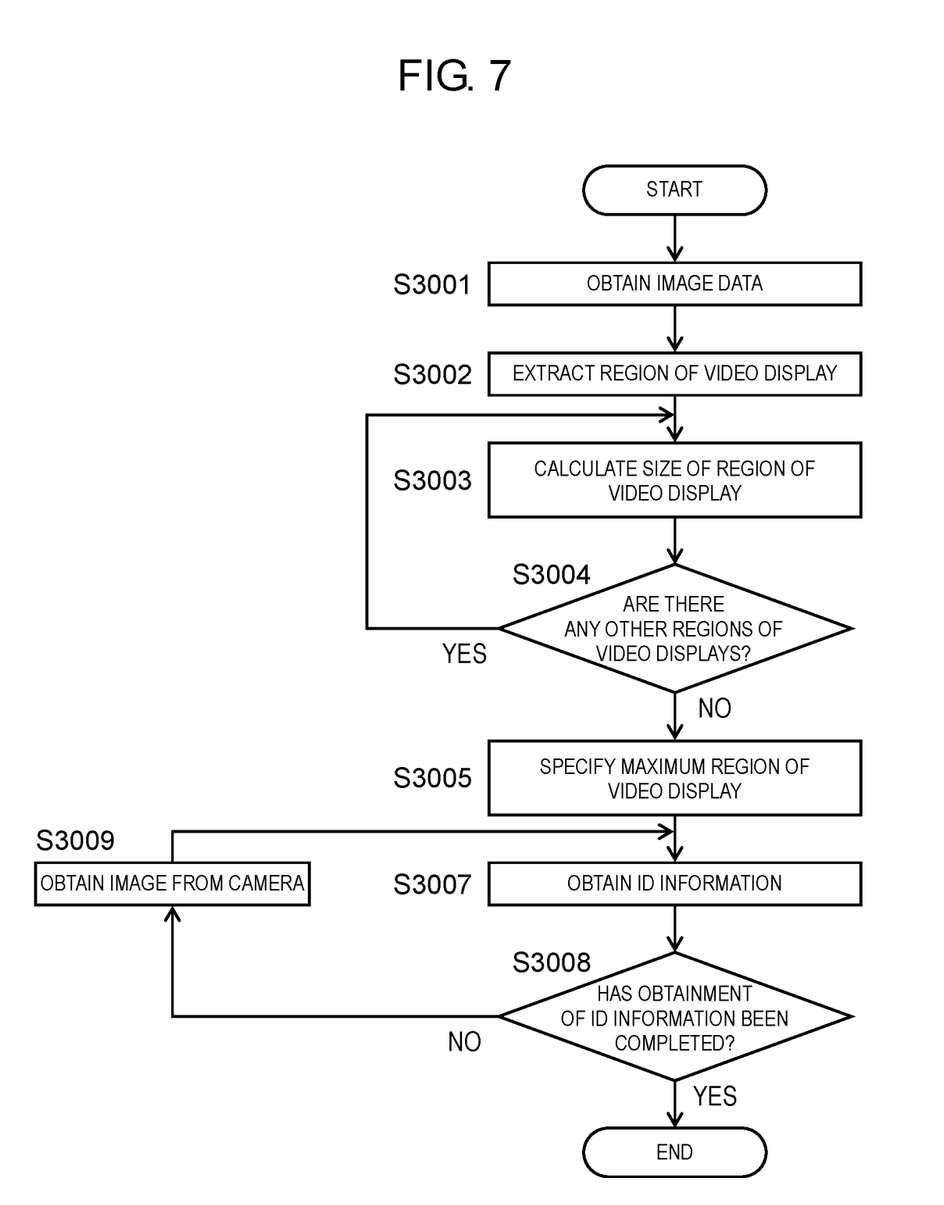
FIG. 7 is a flowchart illustrating processing in which the portable terminal obtains ID information according to the second exemplary embodiment.

An optical communication method according to a second exemplary embodiment is described with reference to FIGS. 6 and 7. FIG. 6 is a diagram illustrating an example of image data obtained by portable terminal 101. Image data 501 indicates video display 102*a* of video display device 102 to be paired and video display 103*a* of another video display device 103. In the present exemplary embodiment, image region 502 and image region 503 exist in image data 501. Video display 102*a* of video display device 102 is indicated in image region 502, and video display 103*a* of video display device 103 is indicated in image region 503. Video display device 102 is disposed so as to correspond to a seat that a passenger who is using portable terminal 101 is sitting on, and therefore video display device 102 is indicated so as to be relatively large. In contrast, video display device 103 is disposed, for example, in a seat diagonally in front of the seat that the passenger is sitting on (see FIG. 1). Stated another way, video display device 103 is disposed in a position farther than a position of video display device 102 when viewed from portable terminal 101, and therefore video display device 103 is indicated so as to be smaller than video display device 102. Stated another way, there is a high probability that video display device 102 to be paired with portable terminal 101 possessed by the passenger is indicated so as to be the largest in the image data.

Accordingly, when image data that camera 201 has captured and has output includes a plurality of image regions each indicating a video display of a video display device, portable terminal 101 according to the present exemplary embodiment selects a largest image region from the plurality of image regions. A size of an image region can be calculated, for example, from coordinates ((X502a, Y502a), (X502b, Y502b), (X503a, Y503a), and (X503b, Y503b) illustrated in FIG. 6) of vertices that configure the image region. Then, portable terminal 101 obtains ID information from the selected image region, and performs pairing.

2-1. Configuration

An outer appearance and an electrical configuration of portable terminal 101 according to the present exemplary embodiment are similar to an outer appearance and an electrical configuration of portable terminal 101 according to the first exemplary embodiment, and a description is omitted.

2-2. Operation

A pairing operation of portable terminal 101 is described with reference to the flowchart illustrated in FIG. 7. In an operation relating to pairing in portable terminal 101 according to the present exemplary embodiment, an operation before the obtainment of image data and a pairing operation after the obtainment of ID information are similar to operations according to the first exemplary embodiment, and a description is omitted. An operation that is different from an operation according to the first exemplary embodiment, namely, an operation in which portable terminal 101 obtains ID information in order to perform pairing, is described below. FIG. 7 is a flowchart illustrating processing in which portable terminal 101 obtains ID information in order to perform pairing.

Step S3001: Controller 205 of portable terminal 101 causes camera 201 to perform an imaging operation so as to obtain image data. The obtained image data is stored in memory 206 in frame units.

Step S3002: Controller 205 extracts, from the obtained image data, an image region where a video display (video display 102a and/or video display 103a) of a video display device (video display device 102 and/or video display device 103) is indicated. At this time, when the image data indicates a plurality of video displays, all of the image regions are extracted. As an example of a method for extracting an image region of a video display from image data, a method for extracting a quadrilateral image region from the image data is conceivable. In addition, a target image region may further narrow under a specified condition. For example, it is conceivable that a passenger uses camera 201 of portable terminal 101 to photograph in such a way that video display device 102 to be paired is located right in a front position, and therefore only a rectangular image region may be extracted.

Step S3003: Controller 205 calculates a size of an image region by using, as a target, one of the image regions of the video displays that have been extracted in step S3002, and stores the size in memory 206. The size of the image region refers, for example, to an area of the image region, and can be expressed by a number of pixels that configure the image region. Controller 205 obtains information indicating the area by counting a number of pixels that configure a target image region in the image data, and stores the information as information indicating the size of the image region in memory 206.

Step S3004: Controller 205 confirms whether there remains an image region that has been extracted in step S3002 and for which a size has not yet been calculated. In a case where it is determined that there remains an image region for which a size has not yet been calculated (YES in S3004), the processing returns to step S3003, and calculation of a size of an image region is repeated by using, as a target, the image region for which the size has not yet been calculated. In a case where it is determined that there does not remain an image region for which a size has not yet been calculated (NO in S3004), the processing moves on to step S3005.

Step S3005: Controller 205 reads all pieces of information relating to the size of the image region of the video display from memory 206, and specifies a largest image region of all of the pieces of information.

Step S3007: Controller 205 obtains ID information from the image region of the video display that has been specified in step S3005. Specifically, controller 205 analyzes the largest image region of the video display in the image data so as to extract a superimposed optical signal, and obtains ID information from the optical signal.

Step S3008: Controller 205 determines whether the obtainment of the ID information from the image data has been completed. The ID information is superimposed onto image data including a plurality of frames in some cases. Captured image data does not include the ID information in other cases. In a case where controller 205 determines that the obtainment of the ID information has not been completed, for example, due to the obtainment of only a portion of the ID information from the image data (NO in S3008), the processing moves on to step S3009. In a case where controller 205 determines that the obtainment of the ID information from the image data has been completed (YES in S3008), controller 205 stores the obtained ID information in memory 206, and terminates the processing.

Step S3009: Controller 205 causes camera 201 to perform an imaging operation so as to obtain image data again. The obtained image data is stored in memory 206 in frame units. Then, the processing of controller 205 moves on to step S3007, and controller 205 repeats processing for obtaining the ID information.

By performing the operation described above, portable terminal 101 obtains the ID information from video display device 102. Then, controller 205 of portable terminal 101 controls network I/F 209 so as to perform pairing with video display device 102 according to Bluetooth on the basis of the obtained ID information. A pairing operation based on paring ID information is similar to an operation according to the first exemplary embodiment, and a description is omitted.

2-3. Advantageous Effects and the Like

As descried above, in the present exemplary embodiment, an optical communication method is an optical communication method for performing optical communication with video display device 102 serving as a communication target. The optical communication method includes: a first step of specifying at least one image region that corresponds to a video display of a video display device, the at least one image region being included in image data that camera 201 of portable terminal 101 has captured and output; a second step of selecting an image region having a largest area as a selected region from among the at least one image region that has been specified; and a third step of extracting a signal on the basis of information relating to the selected region.

This facilitates receiving an optical signal that has been sent by video display device 102 intended by a passenger (video display device 102 that corresponds to a seat that the passenger is sitting on) from among a plurality of video display devices and extracting a necessary signal. Stated another way, the optical communication method according to the present exemplary embodiment is effective to extract a necessary signal from a plurality of optical signals.

Other Exemplary Embodiments

As described above, the exemplary embodiments above have been described as examples of the technique disclosed in the present application. However, the technique of the present disclosure is not limited to these exemplary embodiments, and are also applicable to other exemplary embodiments that have undergone modifications, replacements, additions, omissions, or the like, as appropriate. A new exemplary embodiment can also be made by combining the respective components described in the exemplary embodiments above. Thus, other exemplary embodiments are described as examples below.

(1) In the first exemplary embodiment described above, a configuration has been described in which display width L5 of video display 102a is used as information relating to a size of a light-emitting region. The information relating to the size of the light-emitting region may be information indicating a length of a diagonal line of a rectangular light-emitting region, or may be information indicating an area.

(2) In the first exemplary embodiment described above, a configuration has been described in which a video display device generates ID information and generates a device name from the ID information. The video display device may first generate a device name and may generate ID information from the device name according to a predetermined rule. In this case, portable terminal 101 and video display device 102 share a rule for generating ID information from a device name. In addition, video display device 102 transmits an image to be displayed onto which an optical signal indicating the device name has been superimposed. Portable terminal 101 captures an image of video display 102a so as to obtain the device name, generates ID information from the device name according to the rule described above, and performs pairing.

(3) In the second exemplary embodiment described above, a configuration has been described in which determination is performed on the basis of a size of an image of a video display in image data in order to specify one of a plurality of video displays in the image data. A predetermined condition for specifying one video display is not limited to this. For example, determination may be performed on the basis of a position of an image region in image data as the predetermined condition. Specifically, an image region that has a center position that is located closest to a center position in image data may be selected. Alternatively, determination may be performed on the basis of a luminance of an image region. Specifically, an image region having a highest average luminance of an image region may be selected. In this case, when a video display device enters into a pairing available state according to an operation performed by a passenger, the video display device sends a device name and ID information, and increases a luminance of a video to be displayed on a video display. Here, a video that is the same as a video displayed so far and for which a luminance has been increased may be displayed, or another video having a higher luminance may be displayed.

Figure 8:
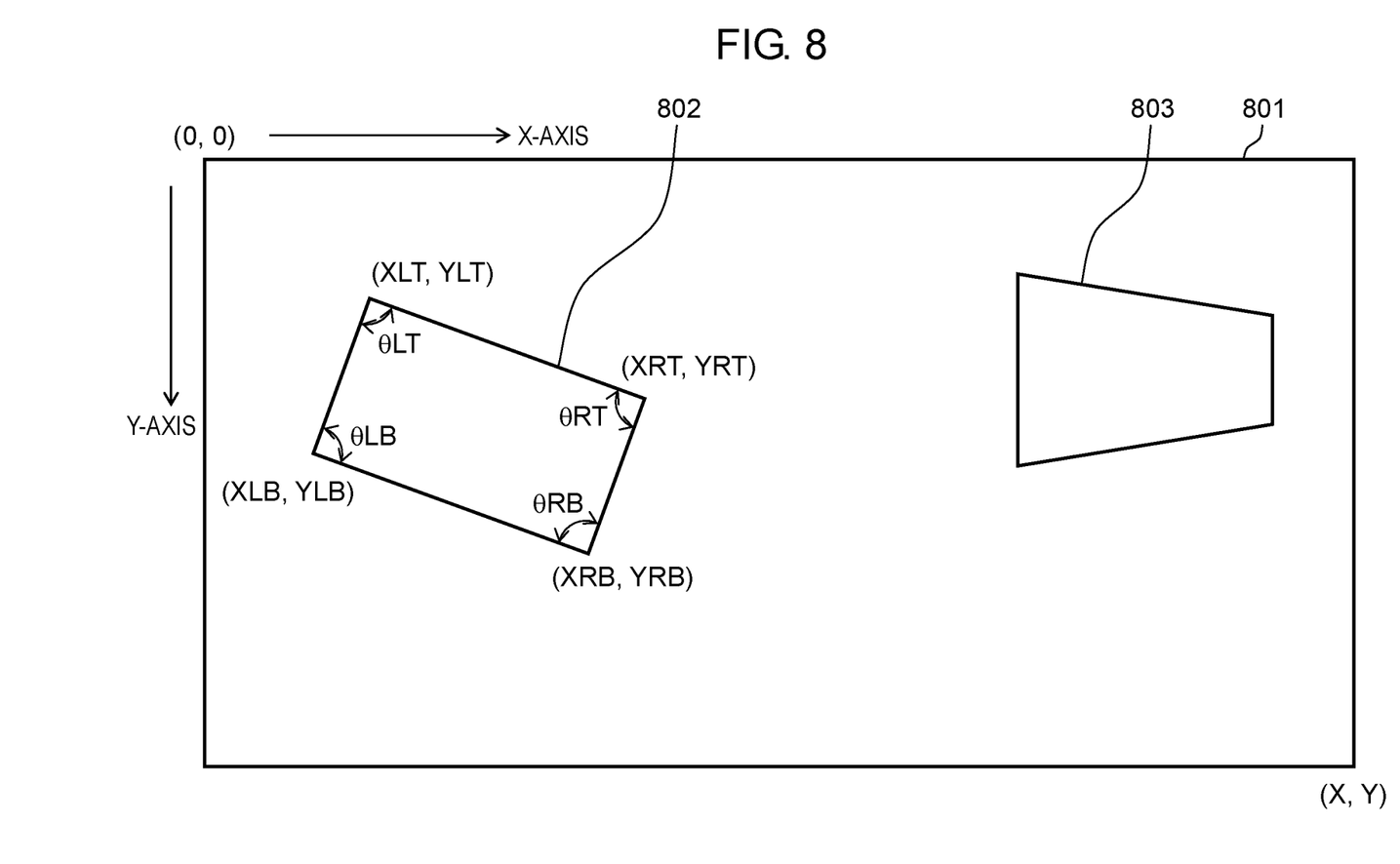
FIG. 8 is a diagram illustrating an example of image data obtained by a portable terminal according to another exemplary embodiment.

In addition, determination may be performed on the basis of a shape of an extracted image region of a video display as the predetermined condition. Specifically, an image region having a shape that is most similar to a rectangle may be selected. How similar the shape of the image region is to a rectangle may be obtained as described below. FIG. 8 is a diagram illustrating an example of image data obtained by a portable terminal. Controller 205 searches image data 801 for a quadrilateral, and consequently extracts two image regions, image region 802 and image region 803. At this time, controller 205 detects positions of vertices of the quadrilateral, and calculates an interior angle of each of the vertices from the positions of the four vertices. It is assumed that coordinates in the image data of the four vertices are (XLT, YLT), (XRT, YRT), (XLB, YLB), and (XRB, YRB). It is also assumed that an interior angle of the vertex (XLT, YLT) is θLT (degree). It is assumed that an interior angle of the vertex (XRT, YRT) is θRT (degree). It is assumed that an interior angle of the vertex (XLB, YLB) is θLB (degree). It is assumed that an interior angle of the vertex (XRB, YRB) is θRB (degree). Here, a rectangle can be defined as a quadrilateral whose interior angle at each vertex is 90 degrees. Accordingly, rectangular degree a indicating how similar a shape of a quadrilateral is to a rectangle is expressed by formula (4) described below.

$$\alpha = |90 - \theta LT| + |90 - \theta RT| + |90 - \theta RB| + |90 - \theta LB| \quad (4)$$

Controller 205 can obtain rectangular degree α for each of the extracted image regions having a quadrilateral shape, and can determine an image region having minimum rectangular degree a to be an image region that is most similar to a rectangle.

Alternatively, when an image region that is most similar to a rectangle is selected, the image region may be selected on the basis of a ratio in length of a long side and a short side in addition to the condition described above (an image region having minimum rectangular degree α). For example, a sum of lengths of each of two pairs of two sides facing each other of four sides of a quadrilateral may be obtained, a value indicating how close to a specified ratio, such as 16:9, a ratio of these sums is may be calculated, and an image region may be selected by using this value.

(4) In the exemplary embodiments described above, an example has been described where a video display is configured by an LCD monitor or the like. The video display may display a video according to another scheme such as organic electroluminescence (EL).

(5) In the exemplary embodiments described above, a configuration has been described in which pairing according to Bluetooth is performed. A communication scheme (a communication standard) may be another scheme such as WiFi.

(6) In the first exemplary embodiment described above, a configuration has been described in which digital zoom processing is performed. A configuration in which, instead of digital zooming, optical zoom processing is performed for performing optical zooming by controlling an optical system of a camera or a configuration in which both digital zoom processing and optical zoom processing are used may be employed.

(7) In the second exemplary embodiment described above, a method in which, in a case where it is determined that the obtainment of ID information has not been completed (NO in S3008), image data is obtained again (S3009), the processing moves on to step S3007, and ID information is obtained has been described as an example. In a case where it is determined that the obtainment of the ID information has not been completed (NO in S3008), the processing may move on to step S3001, image data may be obtained again, and an image region of a video display may be specified again.

As described above, the exemplary embodiments have been described as examples of the technique of the present disclosure. For this purpose, the accompanying drawings and the detailed description have been provided.

Accordingly, in order to exemplify the technique described above, the components described in the accompanying drawings and the detailed description may not only include components that are essential for solving the problems, but may also include components that are not essential for solving the problems. Therefore, it should not be immediately construed that these components that are not essential are essential just because these components that are not essential are described in the accompanying drawings and the detailed description.

Further, the exemplary embodiments above are provided in order to exemplify the technique of the present disclosure, and therefore various modifications, replacements, additions, omissions, or the like can be made without departing from the scope of the claims and the equivalent of the claims.

INDUSTRIAL APPLICABILITY

The optical communication method of the present disclosure is effective to extract a necessary signal from a plurality of optical signals, and is applicable to a wireless communication system in an aircraft, a train, or the like.

What is claimed is:

1. An optical communication method for performing optical communication with a light-emitting device serving as a communication target, the optical communication method comprising:
   a first step of reading information relating to a distance to the light-emitting device and information relating to a size of a light-emitting region included in the light-emitting device, the information relating to the distance and the information relating to the size being stored in advance;
   a second step of controlling an imaging range of a camera based on the information relating to the distance and the information relating to the size, the camera capturing an image of light from the light-emitting device; and
   a third step of extracting a signal from light emitted from the light-emitting device based on image data that the camera has captured in the imaging range.

2. The optical communication method according to claim 1, wherein
   in the second step, a cut-out range that will be cut out from the imaging range is determined based on the information relating to the distance and the information relating to the size, and processing for cutting out image data that corresponds to the cut-out range is performed on the image data captured by the camera, and
   in the third step, the signal is extracted from the light emitted from the light-emitting device based on the image data that has been cut out.

* * * * *